United States Patent
Alarcon et al.

(10) Patent No.: US 10,594,503 B2
(45) Date of Patent: Mar. 17, 2020

(54) DEVICE AND METHOD FOR MANAGING SUBSCRIPTIONS TO MULTICAST TRANSMISSIONS

(71) Applicant: SAGEMCOM BROADBAND SAS, Rueil-Malmaison (FR)

(72) Inventors: Laurent Alarcon, Rueil-Malmaison (FR); Antonie Rocquelay, Rueil-Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 115 days.

(21) Appl. No.: 15/024,109

(22) PCT Filed: Sep. 22, 2014

(86) PCT No.: PCT/EP2014/070078
§ 371 (c)(1),
(2) Date: Mar. 23, 2016

(87) PCT Pub. No.: WO2015/040200
PCT Pub. Date: Mar. 26, 2015

(65) Prior Publication Data
US 2016/0211979 A1 Jul. 21, 2016

(30) Foreign Application Priority Data
Sep. 23, 2013 (FR) ..................... 13 59100

(51) Int. Cl.
*H04L 12/18* (2006.01)
*H04L 29/06* (2006.01)
(52) U.S. Cl.
CPC ........ *H04L 12/185* (2013.01); *H04L 65/4076* (2013.01); *H04L 12/1836* (2013.01)

(58) Field of Classification Search
CPC ............... H04L 12/185; H04L 65/4076; H04L 12/1836
See application file for complete search history.

(56) References Cited

U.S. PATENT DOCUMENTS

| 10,020,952 B1* | 7/2018 | Cai ...................... H04L 12/1886 |
| 2002/0067724 A1* | 6/2002 | Helm .................. H04L 12/1863 |
| | | 370/390 |

(Continued)

FOREIGN PATENT DOCUMENTS

WO  WO 2007/023146  3/2007

OTHER PUBLICATIONS

International Search Report and Written Opinion of the ISA for PCT/EP2014/070078, dated Feb. 3, 2015, 9 pages.

*Primary Examiner* — Pao Sinkantarakorn
*Assistant Examiner* — Kabir U Jahangir
(74) *Attorney, Agent, or Firm* — Nixon & Vanderhye, P.C.

(57) ABSTRACT

The invention relates to managing requests for subscription to multicast transmissions in a communication network, at least two branches thereof being interconnected by an interconnection device comprising a module consuming such subscription requests preventing the propagation of said requests from one branch to another. At least one of said branches comprising at least one bridge device, the interconnection device comprising a subscription announcement module, said subscription announcement module performs the following step: upon reception (404; 412) via a branch of a first request for subscription to a multicast transmission, transmitting (407; 415) a second request for subscription to said multicast transmission at least via the branch via which said first subscription request was received.

12 Claims, 6 Drawing Sheets

(56) References Cited

U.S. PATENT DOCUMENTS

| | | | |
|---|---|---|---|
| 2003/0083087 A1* | 5/2003 | Ekl | .................... H04L 12/1877 |
| | | | 455/518 |
| 2006/0268869 A1* | 11/2006 | Boers | ..................... H04L 45/00 |
| | | | 370/390 |
| 2007/0140213 A1 | 6/2007 | Milligan et al. | |
| 2011/0200042 A1 | 8/2011 | Goli et al. | |

* cited by examiner

DEVICE AND METHOD FOR MANAGING SUBSCRIPTIONS TO MULTICAST TRANSMISSIONS

This application is the U.S. national phase of International Application No. PCT/EP2014/070078 filed 22 Sep. 2014, which designated the U.S. and claims priority to FR Patent Application No. 13/59100 filed 23 Sep. 2013, the entire contents of each of which are hereby incorporated by reference.

BACKGROUND OF THE INVENTION

(1) Field of the Invention

The present invention relates to the management of requests for subscription to multicast transmissions in a communication network.

(2) Description of Related Art

Numerous applications and items of equipment, such as for example the iTunes (registered trade mark) software or shared printers, use multicast transmission protocols. The SSDP (Simple Service Discovery Protocol) and mDNS (multicast Domain Name System) protocols can for example be mentioned Devices for interconnecting communication networks may comprise modules consuming requests for subscription to (and corresponding requests for unsubscription from) multicast transmissions. Such request-consuming modules enable limiting the broadcasting of these requests within communication networks. Referring to the IGMP (Internet Group Management Protocol, as defined by the standard RFC 2236 (IGMPv2) and by the standards RFC 3376 and RFC 4604 (IGMPv3)), such request-consuming modules take the form of IGMP proxy modules. The same principle also applies in the context of the MLD protocol (Multicast Listener Discovery, as defined in the standard RFC 4604 (MLDv2)). Such communication-network interconnection devices are for example residential gateways for connecting an LAN (Local Area Network) and a WAN (Wide Area Network) such as the Internet.

LAN networks may comprise bridge devices external to the aforementioned interconnection devices. These external bridge devices are not passive vis-à-vis the multicast transmissions and may in particular perform a filtering which, in combination with a consumer module in the interconnection device, prevents the aforementioned applications from functioning correctly. Indeed, when said interconnection device interconnects two branches of the LAN network, the subscription-request consuming module consumes the request for subscription to (and unsubscription from) multicast transmissions for which a server is situated on one of said branches and a client is situated on another of said branches. The subscription request being consumed by the subscription-request consuming module, at least one external bridge device may, through lack of prior configuration, be in a situation of filtering the multicast messages transmitted in the context of said multicast transmissions.

It is desirable to overcome these drawbacks of the prior art. It is in particular desirable to provide a solution that enables providing multicast transmissions between a terminal device situated on a branch of a communication network and at least one other terminal device situated on another branch of the communication network when at least one of said branches comprises a bridge device that can be configured for filtering multicast messages, the two branches of the communication network being linked by an interconnection device having a module consuming requests for subscription to multicast transmissions for preventing the propagation of said requests from one said branch to another. It is however also desirable to limit the broadcasting of such subscription requests in the communication network.

It is also desirable to provide a solution that is simple to implement.

BRIEF SUMMARY OF THE INVENTION

The invention relates to a method for managing requests for subscription to multicast transmissions in a communication network, at least two branches thereof being interconnected by an interconnection device comprising a module consuming such subscription requests for preventing the propagation of said requests from one branch to another branch of the communication network, at least one of said branches comprising at least one bridge device. The method is such that, the interconnection device comprising a subscription announcement module, said subscription announcement module performs the following step: upon reception via a branch of a first request for subscription to a multicast transmission, transmitting a second request for subscription to said multicast transmission at least via the branch by which said first subscription request was received. Thus, by sending a second subscription request at least via the branch by which the first subscription request reached the interconnection device, the bridge devices placed on said branch can configure themselves correctly to allow the multicast transmission to succeed in the communication network.

According to a particular embodiment, said subscription announcement module performs the following step: upon reception by a branch of a first request to unsubscribe from a multicast transmission, transmitting a second unsubscription request to said multicast transmission at least via said branch via which said first unsubscription request was received. Thus, by sending a second unsubscription request at least via the branch by which the first unsubscription request reached the interconnection device, the bridge devices placed on said branch can keep their configuration up-to-date vis-à-vis the multicast transmission.

According to a particular embodiment, said subscription announcement module performs the following steps: upon reception via a branch of said first subscription request, transmitting said second subscription request via each of said branches; and, upon reception of a multicast message in the context of said multicast transmission, creating a virtual client in association with the branch via which said multicast message was received. Thus the multicast transmission succeeds, even if a server device of the multicast transmission does not transmit any request for subscription to said multicast transmission.

According to a particular embodiment, said subscription announcement module periodically or pseudo-periodically transmits the second subscription request solely via said branch via which said first request was received and via said branch for which the virtual client was created. Thus the multicast transmission continues to succeed, even when the information contained in the request for subscription to the multicast transmission has a limited lifetime.

According to a particular embodiment, said subscription announcement module deletes said virtual client when the interconnection device considers that the last client of said multicast transmission is disconnected.

According to a particular embodiment, when each server of the multicast transmission is supposed to send a request for subscription to said multicast transmission, said subscription announcement transmits said second subscription request solely via said branch via which said first request was received.

According to a particular embodiment, said subscription announcement module periodically or pseudo-periodically transmits the second subscription request solely via said branch via which said first request was received. Thus the broadcasts of subscription requests in the communication network are reduced, even when the information contained in the request for subscription to the multicast transmission has a limited lifetime.

According to a particular embodiment, the interconnection device comprising an internal bridge device, each branch is identified by the port of said internal bridge device via which said branch is connected.

According to a particular embodiment, the interconnection device is a residential gateway.

The invention also relates to an interconnection device adapted for managing requests for subscription to multicast transmissions in a communication network, at least two branches of which are interconnected by the interconnection device, the interconnection device comprising a module consuming such subscription requests preventing the propagation of said requests from one branch to another branch in the communication network, at least one of said branches being intended to comprise at least one bridge device. The interconnection device comprises a subscription announcement module and implements, upon reception via a branch of a first request for subscription to a multicast transmission, means for transmitting a second request for subscription to said multicast transmission at least via the branch via which said first subscription request was received.

The invention also relates to a computer program, which can be stored on a medium and/or downloaded from a communication network, in order to be read by a processor. This computer program comprises instructions for implementing any one of the methods mentioned above, when said program is executed by the processor. The invention also relates to storage means comprising such a computer program.

BRIEF DESCRIPTION OF THE SEVERAL VIEWS OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

In the present description, the term "multicast" should be understood in the broad sense, meaning that the term qualifies transmissions for which at least one server device addresses potentially a plurality of clients by way of the same IP address. Thus the term "multicast" also covers multipoint to multipoint transmissions, in which a plurality of servers address themselves potentially to a plurality of clients by way of the same IP address.

Hereinafter a request for subscription to multicast data transmissions is referred to as JOIN request, a term borrowed from IGMP and MLD terminologies, and which is found in numerous works dealing with multicast transmissions. According to the same principle, a request to unsubscribe from multicast data transmissions is referred to as LEAVE request.

Figure 1:
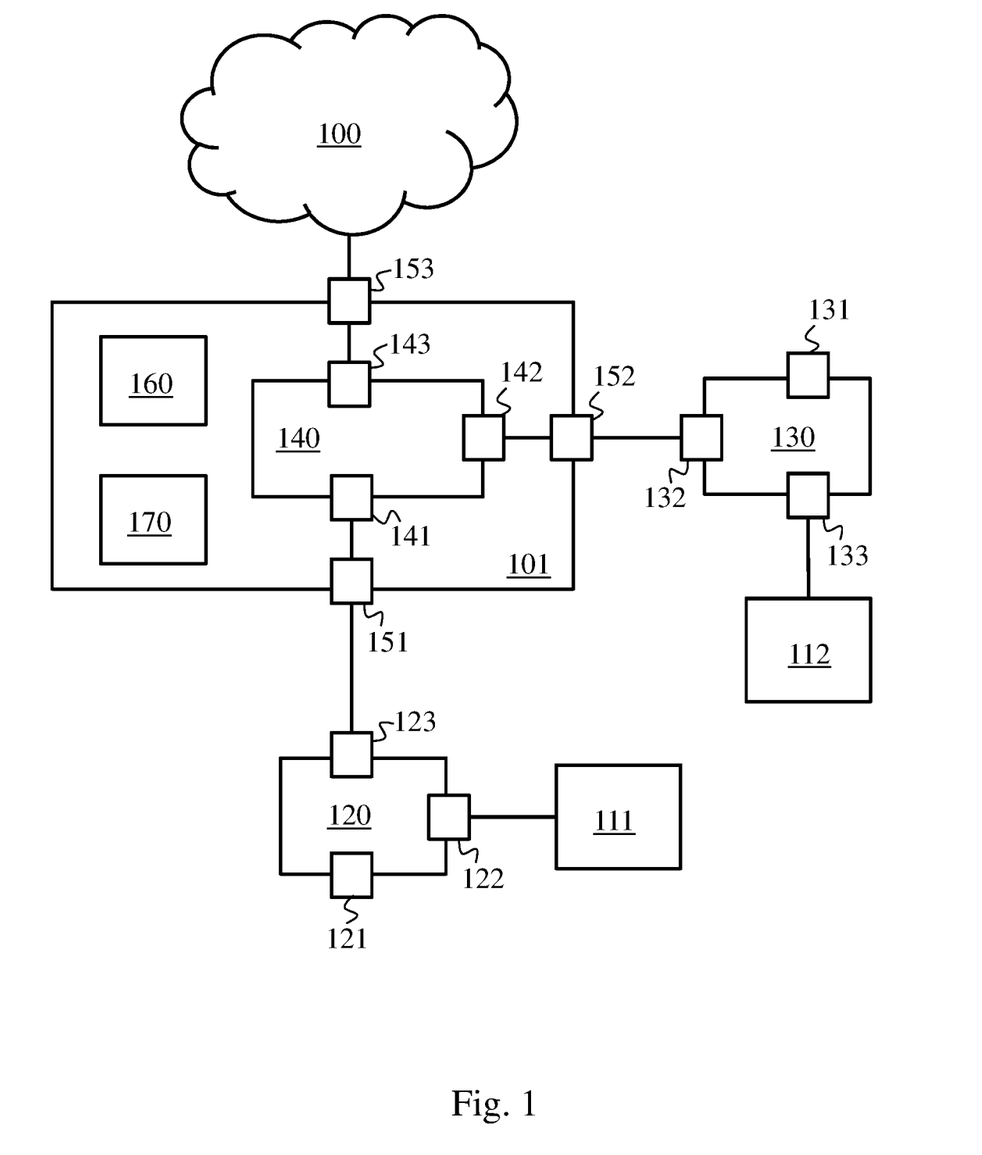
FIG. 1 schematically illustrates a system based on a communication network, in which the present invention can be implemented.

FIG. 1 schematically illustrates a system based on a communication network, in which the present invention can be implemented.

The system depicted schematically in FIG. 1 comprises an interconnection device 101. The interconnection device 101 comprises a first interface 151 adapted for connecting a first branch of the communication network and a second interface 152 adapted for connecting a second branch of the communication network. For example, the first interface 151 is an interface of the Ethernet type, as defined in the family of standards IEEE 802.3, and the second interface 152 is an interface of the WiFi type, as defined in the family of standards IEEE 802.11. The interconnection device 101 may comprise a third interface 153 for connecting the interconnection device 101 to a WAN (Wide Area Network) 100, such as the Internet.

In a preferred embodiment, the communication network is a network of the LAN (Local Area Network) type and the interconnection device 101 is a residential gateway. By way of illustration, this is the case that will be considered hereinafter.

The system schematically depicted in FIG. 1 further comprises a first bridge device 120 and a second bridge device 130. The first bridge device 120 comprises a plurality of ports 121, 122, 123. The second bridge device 130 also comprises a plurality of ports 131, 132, 133.

Each of the first 120 and second 130 bridge devices are adapted, when said bridge device receives a JOIN request, for determining via which port of the bridge device said JOIN request was received and for propagating the JOIN request via the other ports of said bridge device. Said bridge device stores information representing said port via which said JOIN request was received, in association with the multicast IP address to which said JOIN request relates, until a corresponding LEAVE request is received or a time delay of predefined duration has elapsed without a new JOIN request being received. Indeed, preferably, a device wishing to continue to participate in multicast transmissions periodically sends JOIN requests in order to keep active the subscription to said multicast transmissions. This means that the information relating to a JOIN request has a certain lifetime and that the time delay aims to detect a stoppage of the periodic sending of these JOIN requests.

Thus, when the first bridge device 120 of the second bridge device 130 receives a multicast message at a certain multicast IP address, said bridge device seeks in memory the presence of said multicast IP address among the information stored upon JOIN message reception. Said bridge device then retrieves information representing the port or ports of said bridge device with which said multicast IP address is associated. Said bridge device then propagates said multicast message via said port or ports, with the exception of the port via which said multicast message was received if this port forms part of the whole set of ports stored in memory in association with said multicast IP address.

In FIG. 1, the first bridge device 120 is connected, via its port 123, to the first interface 151 of the interconnection device 101 and the second bridge device 130 is connected, via its port 132, to the second interface 152 of the interconnection device 101.

The interconnection device 101 further comprises a module 160 consuming requests for subscription to and unsubscription from multicast transmissions. The consuming module 160 is adapted for spying on and consuming the JOIN and LEAVE messages reaching the third bridge device 140, in particular the JOIN and LEAVE messages received via the first 151 and second 152 interfaces of the interconnection device 101. The consuming module 160 takes for example the form of an IGMP proxy aimed at limiting propagations of IGMP messages in the communication network. The consuming module 160 is then in particular responsible for identifying the IGMP messages requiring subscriptions or unsubscriptions with regard to multicast transmissions issuing from the WAN 100.

The interconnection device 101 preferably comprises a third bridge device 140, referred to an internal bridge device compared with the first 120 and second 130 bridge devices referred to as external vis-à-vis the interconnection device 101. The third bridge device 140 comprises a plurality of ports 141, 142, 143. The port 141 of the third bridge device 140 is connected to the first interface 151 and the port 142 of the third bridge device 140 is connected to the second interface 152. Furthermore, the port 143 of the third bridge device 140 may be connected to the third interface 153. The third bridge device 140 is adapted, when said third bridge device 140 receives a JOIN request, for determining via which port of the third bridge device 140 said JOIN request was received. The third bridge device stores information representing said port via which said JOIN request was received, in association with the multicast IP address to which said JOIN request relates, until a corresponding LEAVE request is received or a time delay of predefined duration has elapsed without a new JOIN request being received. The JOIN request is then consumed by the consuming module 160, as already mentioned above.

Thus, when the third bridge device 140 receives a multicast message at a certain multicast IP address, said bridge device seeks in memory the presence of said multicast IP address among the information stored upon JOIN message reception. Said bridge device then retrieves information representing the port or ports of the third bridge device 140 with which said multicast IP address is associated. The third bridge device 140 then propagates said multicast message via said port or ports, with the exception of the port via which said multicast message was received if this port forms part of the whole set of ports stored in memory in association with said multicast IP address.

Thus, when the interconnection device comprises the third bridge device 140, each branch of the communication network is identified by the port of the third bridge device 140 via which said branch is connected.

According to the present invention, the interconnection device 101 further comprises a subscription announcement module 170 for managing the subscriptions to and unsubscriptions from multicast transmissions issuing from the communication network, for example multicast transmissions involving the first 111 and second 112 terminal devices. The behaviour of the subscription announcement module 170 is described hereafter in relation to FIGS. 4 to 7.

In FIG. 1, a first terminal device 111 is connected to the port 122 of the first bridge device 120 and a second terminal device 112 is connected to the port 133 of the second bridge device 130. Exchanges of messages, in the context of multicast transmissions between the first 111 and second 112 terminal devices, are detailed hereafter in relation to FIGS. 3 to 7.

Figure 2:
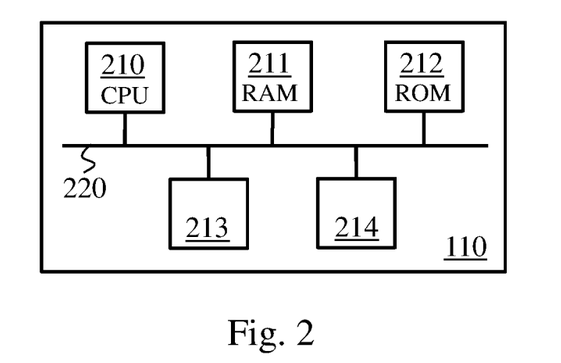
FIG. 2 schematically illustrates an example of hardware architecture of an interconnection device of the system of FIG. 1.

FIG. 2 schematically illustrates an example of hardware architecture of all or part of the interconnection device 101.

The interconnection device 101 then comprises, connected by a communication bus 220: a processor or CPU (Central Processing Unit) 210; a Random Access Memory (RAM) 211; a Read Only Memory (ROM) 212; a storage unit or a storage medium reader, such as an SD (Secure Digital) card reader or an HDD (Hard Disk Drive) 213; and a set of interfaces 214 enabling the interconnection device 101 to communicate via the communication network.

The processor 210 is capable of executing instructions loaded in the RAM 211 from the ROM 212, from an external memory (not shown), from a storage medium, or from a communication network. When the interconnection device 101 is powered up, the processor 210 is capable of reading instructions from the RAM 211 and executing them. These instructions form a computer program causing the implementation, by the interconnection device 101, of all or some of the algorithms and steps relating to the exchanges of messages described hereafter in relation to FIGS. 4 to 7.

Thus all or some of the algorithms and steps relating to the message exchanges described hereafter in relation to FIGS. 4 to 7 may be implemented in software form by the execution of a set of instructions by a programmable machine, such as a DSP (Digital Signal Processor) or a microcontroller. All or some of the algorithms and steps relating to the message exchanges described hereafter in relation to FIGS. 4 to 7 may also be implemented in hardware form by a machine or a dedicated component, such as a FPGA (Field-Programmable Gate Array) or an ASIC (Application-Specific Integrated Circuit).

Figure 3:
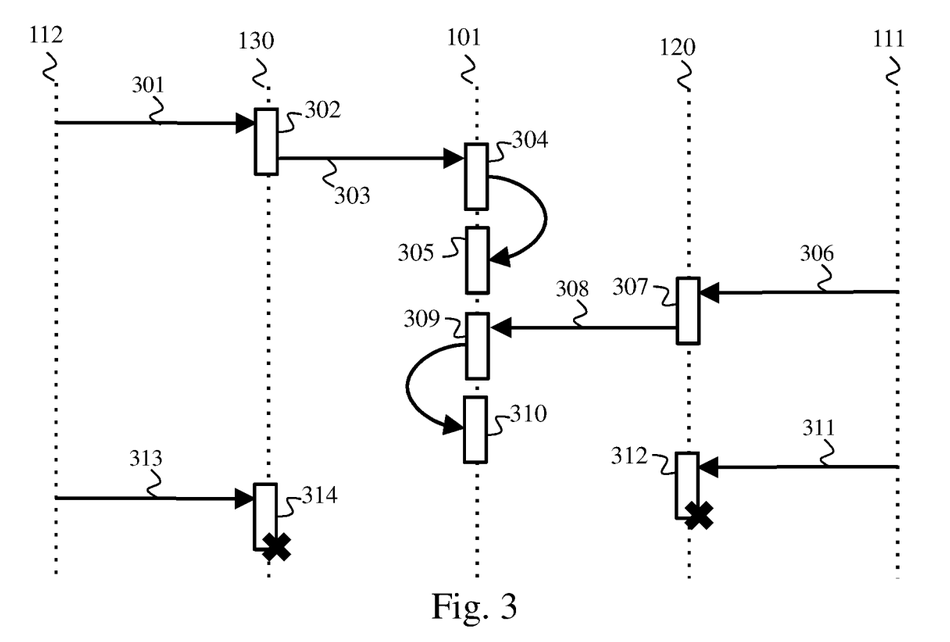
FIG. 3 schematically illustrates message exchanges in the context of a subscription to multicast transmissions via the communication network, as known in the prior art.

FIG. 3 schematically illustrates exchanges of messages in the context of a subscription to multicast transmissions via the communication network, as known in the prior art. It is then considered that the interconnection device 101 does not implement the subscription announcement module 170.

In a step 301, the second terminal device 112 transmits a JOIN message in order to subscribe the second terminal device 112 to a multicast transmission identified by an IP address (denoted IP1) specific to this multicast transmission.

In a step 302, the second bridge device 130 receives the JOIN message transmitted at the step 301, identifies via which port of said second bridge device 130 said JOIN message was received and stores in memory information representing said port and said address IP1. The second bridge device 130 then, in a step 303, propagates said JOIN message over all the other ports of said second bridge device 130, i.e. all the ports of said second bridge device 130 with the exception of the port via which said JOIN message was received.

In a step 304, the interconnection device 101 receives said JOIN message propagated by the second bridge device 130 at the step 303 and identifies via which port of said third bridge device 130 said JOIN message was received. The received JOIN message is then processed by the consuming module 160. The consuming module 160 determines whether the received JOIN message implies a subscription to a multicast transmission issuing from the WAN 100. In the context of multicast transmissions located on the communication network formed by the branches connected to the first 151 and second 152 interfaces of the interconnection device 101, no subscription to a multicast transmission issuing from the WAN 100 is required. The consuming module 160 then deletes the received JOIN message, in a step 305. The JOIN message is then not propagated in the rest of the communication network and the first bridge device 120 is not informed of this JOIN message.

Symmetrically, in a step 306, the first terminal device 111 transmits a JOIN message in order to subscribe the first terminal device 111 to the same multicast transmission.

In a step 307, the first bridge device 120 receives the JOIN message transmitted at the step 306, identifies via which port of said first bridge device 120 said JOIN message was received and stores in memory information representing said port and said address IP1. The first bridge device 120 then, in a step 308, propagates said JOIN message over all the other ports of said first bridge device 120, i.e. all the ports of said first bridge device 120 with the exception of the port via which said JOIN message was received.

In a step 309, the interconnection device 101 receives said JOIN message propagated by the first bridge device 120 at the step 308 and identifies via which port of said third bridge device 130 said JOIN message was received. The received JOIN message is then processed by the consuming module 160. The consuming module 160 determines whether the received JOIN message implies a subscription to a multicast transmission issuing from the WAN 100. As this is not the case, the consuming module 160 then deletes the received JOIN message, in a step 310. The JOIN message is then not propagated in the rest of the communication network and the second bridge device 130 is not informed of this JOIN message.

When the first terminal device 111 transmits in a step 311 a multicast message to the address IP1, this message is received by the first bridge device 120 in a step 312. The first bridge device 120 retrieves the address IP1 uniquely associated with the port 122, which is the port via which said multicast message at the address IP1 was received. The first bridge device 120 does not then propagate said message and discards it. In addition, when the second terminal device 112 transmits in a step 313 a multicast message to the address IP1, this message is received by the second bridge device 130 in a step 314. The second bridge device 130 retrieves the address IP1 uniquely associated with the port 133, which is the port via which said multicast message at the address IP1 was received. The second bridge device 130 then does not propagate said message and discards it. The multicast transmissions in the communication network cannot then succeed. Implementing the subscription announcement module 170 aims to overcome this problem, as detailed below in relation to FIGS. 4 to 7.

FIG. 3 schematically depicts an attempt at establishing a bidirectional multicast transmission between the first 111 and second 112 terminal devices. The same result would be achieved in the context of a unidirectional multicast transmission from the first terminal device 111 to the second terminal device 112.

Figure 4:
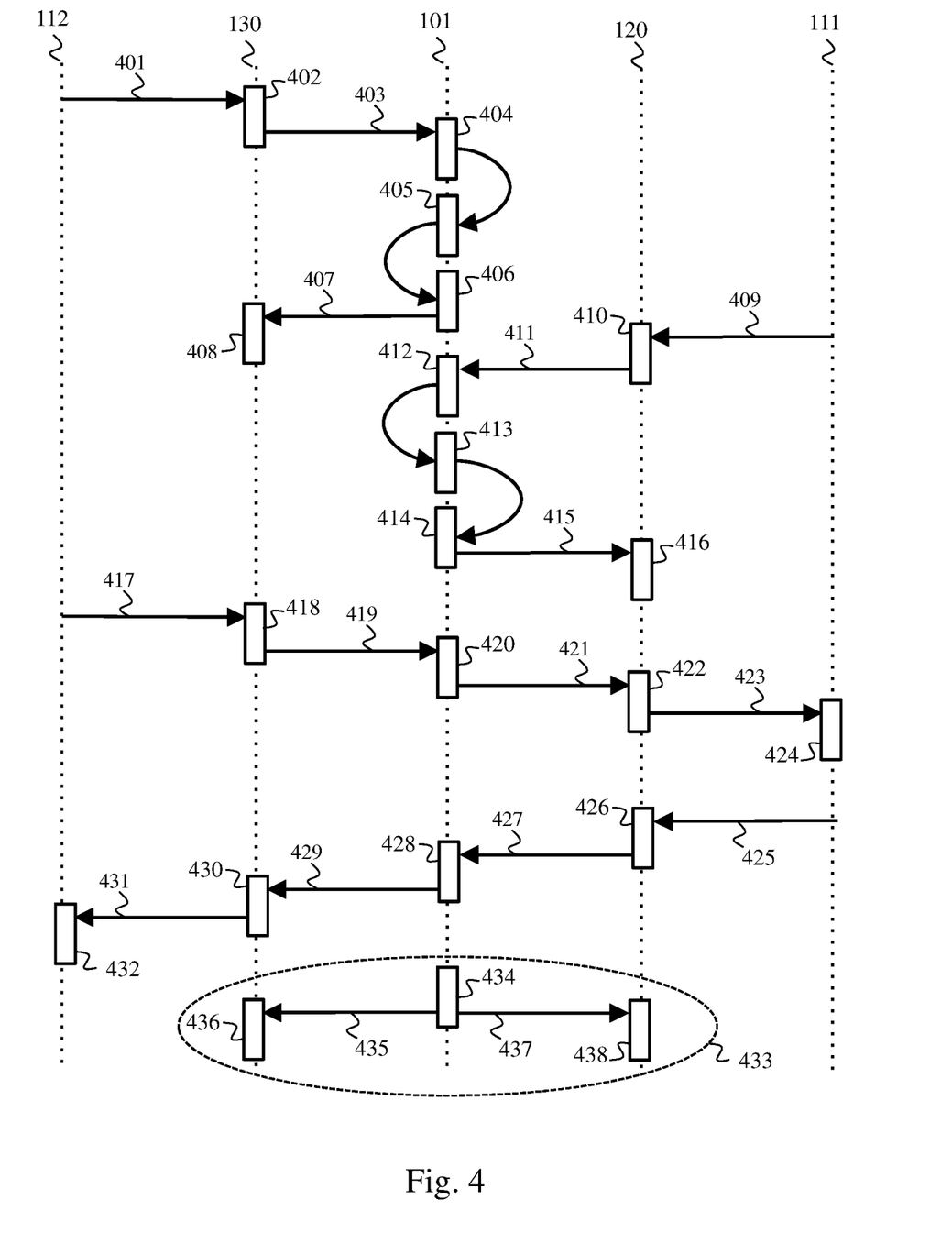
FIG. 4 schematically illustrates message exchanges in the context of subscription to multicast transmissions via the communication network, according to a first embodiment of the invention.

FIG. 4 schematically illustrates message exchanges in the context of a subscription to multicast transmissions via the communication network, according to a first embodiment of the invention.

In a step 401, the second terminal device 112 transmits a JOIN message in order to subscribe the second terminal device 112 to a multicast transmission identified by the address IP1.

In a step 402, the second bridge device 130 receives the JOIN message transmitted at the step 401, identifies via which port of said second bridge device 130 said JOIN message was received and stores in memory information representing said port and said address IP1. The second bridge device 130 then, in a step 403, propagates said JOIN message over all the other ports of said second bridge device 130, i.e. all the ports of said second bridge device 130 with the exception of the port via which said JOIN message was received.

In a step 404, the interconnection device 101 receives said JOIN message propagated by the second bridge device 130 at the step 403 and identifies via which port of said third bridge device 140 said JOIN message was received. The received JOIN message is then processed by the consuming module 160 and by the subscription announcement module 170. The consuming module 160 determines whether the received JOIN message implies a subscription to a multicast transmission issuing from the WAN 100. In the context of multicast transmissions located on the communication network formed by the branches connected to the first 151 and second 152 interfaces of the interconnection device 101, no subscription to a multicast transmission issuing from the WAN 100 is required. The consuming module 160 then deletes the received JOIN message, in a step 405. In a step 406, the subscription announcement module 170 identifies via which port of said third bridge device 140 said JOIN message was received and stores information representing said port in association with the address IP1.

In a step 407, the subscription announcement module 170 transmits a JOIN message concerning the multicast transmission identified by the address IP1 via the port via which the previous JOIN message transmitted by the second terminal device 112 was received, meaning the port 142. This JOIN message, transmitted by the subscription announcement module 170, is then received by the second bridge device 130 via the port 132 in a step 408. The second bridge device 130 then identifies via which port of said second bridge device 130 said JOIN message was received and stores in memory information representing said port and said address IP1. The second bridge device 130 then propagates the JOIN message, received at the step 408, via the other ports of the second bridge device 130 (a step not shown in FIG. 4).

Symmetrically, in a step 409, the first terminal device 111 transmits a JOIN message in order to subscribe the first terminal device 111 to the same multicast transmission.

In a step 410, the first bridge device 120 receives the JOIN message transmitted at the step 409, identifies via which port of said first bridge device 120 said JOIN message was received and stores in memory information representing said port and said address IP1. The first bridge device 120 then, in a step 411, propagates said JOIN message over all the other ports of said first bridge device 120, i.e. all the ports of said first bridge device 120 with the exception of the port via which said JOIN message was received.

In a step 412, the interconnection device 101 receives said JOIN message propagated by the first bridge device 120 at the step 411 and identifies via which port of said third bridge device 140 said JOIN message was received. The received JOIN message is then processed by the consuming module 160 and by the subscription announcement module 170. The consuming module 160 determines whether the received JOIN message implies a subscription to a multicast transmission issuing from the WAN 100. As this is not the case, the consuming module 160 then deletes the received JOIN message, in a step 413. In a step 414, the subscription announcement module 170 identifies via which port of said third bridge device 140 said JOIN message was received and stores information representing said port in association with the address IP1.

In a step 415, the subscription announcement module 170 transmits a JOIN message concerning the multicast transmission identified by the address IP1 via the port via which the previous JOIN message transmitted by the first terminal device 111 was received, meaning the port 141. This JOIN message transmitted by the subscription announcement module 170 is then received by the first bridge device 120 via the port 123 in a step 416. The first bridge device 120 then identifies via which port of said first bridge device 120 said JOIN message was received and stores in memory information representing said port and said address IP1. The first bridge device 120 then propagates the JOIN message, received at the step 416, via the other ports of the first bridge device 120 (a step not shown in FIG. 4).

When the second terminal device 112 transmits a multicast message to the address IP1 in a step 417, this message is received by the second bridge device 130 in a step 418. The second bridge device 130 retrieves the address IP1 associated with the port 132 and with the port 133. The multicast message being received via the port 133, the second bridge device 130 propagates said multicast message via the port 132 in a step 419. The multicast message is then received by the interconnection device 101 in a step 420. The interconnection device 101 retrieves the address IP1 associated with the port 141 and with the port 142. The multicast message being received via the port 142, the third bridge device 140 propagates said multicast message via the port 141 in a step 421. The multicast message is then received by the first bridge device 120 in a step 422. The first bridge device 120 retrieves the address IP1 associated with the port 122 and with the port 123. The multicast message being received via the port 123, the first bridge device 120 propagates said multicast message via the port 122 in a step 423. The multicast message is then received and consumed by the first terminal device 111 in a step 424.

When the first terminal device 111 transmits a multicast message to the address IP1 in a step 425, this message is received by the first bridge device 120 in a step 426. The first bridge device 120 retrieves the address IP1 associated with the port 122 and with the port 123. The multicast message being received via the port 122, the first bridge device 120 propagates said multicast message via the port 123 in a step 427. The multicast message is then received by the interconnection device 101 in a step 428. The interconnection device 101 retrieves the address IP1 associated with the port 141 and with the port 142. The multicast message being received via the port 141, the third bridge device 140 propagates said multicast message via the port 142 in a step 429. The multicast message is then received by the second bridge device 130 in a step 430. The second bridge device 130 retrieves the address IP1 associated with the port 132 and with the port 133. The multicast message being received via the port 133, the second bridge device 130 propagates said multicast message via the port 133 in a step 431. The multicast message is then received and consumed by the second terminal device 112 in a step 432.

Implementing the subscription announcement module 170, the behaviour of which was described above, thus enables the multicast transmissions in the communication network to succeed.

In a particular embodiment, when the subscriptions to multicast transmissions shall be maintained by periodic or pseudo-periodic sendings of JOIN messages, the subscription announcement module 170 makes such periodic or pseudo-periodic sendings of JOIN messages as follows. In FIG. 4, this periodic sending phase is symbolised by the group of steps 433. In a step 434, the subscription announcement module 170 detects that a time delay of predefined duration has elapsed since the sending of the previous JOIN message or messages by said subscription announcement module 170. The subscription announcement module 170 retrieves the information representing each port of the third bridge device 140 via which a JOIN message was previously received and stored (during the steps 406 and 414 for example). In the context of FIG. 4, the subscription announcement module 170 retrieves an identifier of the port 141, as stored during the step 414, and an identifier of the port 142, as stored during the step 406. Next, the subscription announcement module 170 generates and transmits a JOIN message, corresponding to the address IP1, via each port thus identified. Thus, in a step 435, the subscription announcement module 170 transmits this JOIN message via the port 142. This JOIN message is received by the second bridge device 130 in a step 436. The second bridge device 130 increases the lifetime of the multicast transmission associated with the address IP1 with regard to the port via which the JOIN message is received. i.e. the port 132, and propagates the JOIN message via the other ports, i.e. all the ports of said second bridge device 130 with the exception of the port via which said JOIN message was received (a step not shown in FIG. 4). In addition, in a step 437, the subscription announcement module 170 transmits the JOIN message via the port 141. This JOIN message is received by the first bridge device 120 in a step 438. The first bridge device 120 increases the lifetime of the multicast transmission associated with the address IP1 with regard to the port via which the JOIN message is received, i.e. the port 132, and propagates the JOIN message via the other ports, i.e. all the ports of said first bridge device 120 with the exception of the port via which said JOIN message was received (a step not shown in FIG. 4). Next the subscription announcement module 170 reinitialises the time delay, for a subsequent reactivation of the periodic sending phase 433.

FIG. 4 schematically depicts an establishment of bidirectional multicast transmission between the first 111 and second 112 terminal devices. The same result would be achieved in the context of a unidirectional multicast transmission from the first terminal device 111 to the second terminal device 112, since the terminal device 111 sends a JOIN message to subscribe to the multicast transmission although the terminal device 111 has the role of server in said multicast transmission.

Figure 5:
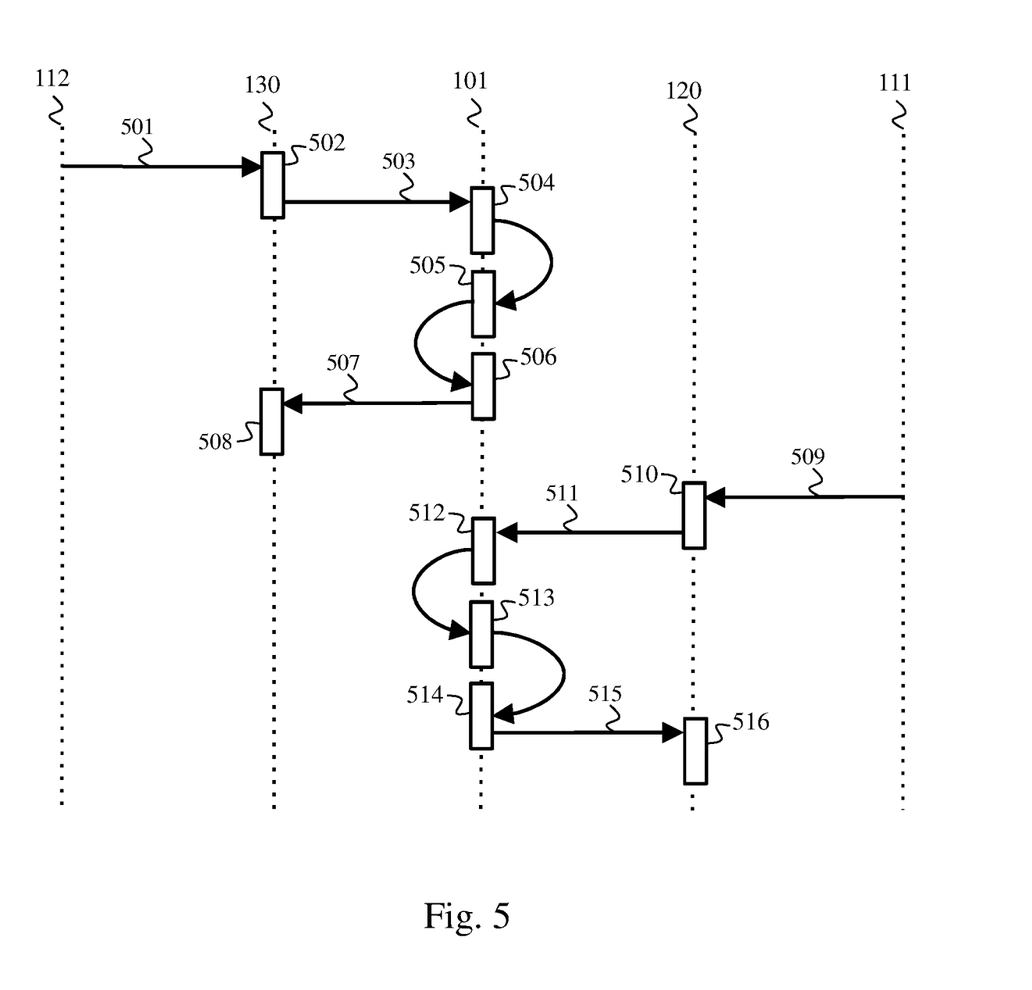
FIG. 5 schematically illustrates message exchanges in the context of unsubscription from multicast transmissions via the communication network, according to a first embodiment of the invention.

FIG. 5 schematically depicts exchanges of messages in the context of unsubscription from multicast transmissions via the communication network, according to the first embodiment of the invention.

In a step 501, the second terminal device 112 transmits a LEAVE message in order to unsubscribe the second terminal device 112 from the multicast transmission identified by the address IP1.

In a step 502, the second bridge device 130 receives the LEAVE message transmitted at the step 501, identifies via which port of said second bridge device 130 said LEAVE message was received and seeks in memory the presence of information representing said port and said address IP1. When the second bridge device 130 finds this information, said second bridge device 130 deletes this information from its memory and, in a step 503, propagates said LEAVE message over all the other ports of said second bridge device 130, i.e. all the ports of said second bridge device 130 with the exception of the port via which said LEAVE message was received.

In a step 504, the interconnection device 101 receives said LEAVE message propagated by the second bridge device 130 at step 503 and identifies via which port of said third bridge device 140 said LEAVE message was received. The LEAVE message received is then processed by the consuming module 160 and by the subscription announcement module 170. The consuming module 160 determines whether the received LEAVE message implies an unsubscription from a multicast transmission issuing from the WAN 100. In the context of multicast transmissions located on the communication network formed by the branches connected to the first 151 and second 152 interfaces of the interconnection device 101, no unsubscription from a multicast transmission issuing from the WAN 100 is required. The consuming module 160 then deletes the received LEAVE message, in a step 505. In a step 506, the subscription announcement module 170 identifies via which port of said third bridge device 140 said LEAVE message was received and seeks in memory the presence of information representing said port in association with the address IP1. When the subscription announcement module 170 finds this information, said subscription announcement module 170 deletes this information from its memory. Next, in a step 507, the subscription announcement module 170 transmits a LEAVE message concerning the multicast transmission identified by the address IP1 via the port via which the previous LEAVE message transmitted by the second terminal device 112 was received, meaning the port 142. This LEAVE message transmitted by the subscription announcement module 170 is then received by the second bridge device 130 via the port 132 in a step 508. The second bridge device 130 then identifies via which port of said second bridge device 130 said LEAVE message was received and seeks in memory the presence of information representing said port in said address IP1. When the second bridge device 130 finds this information, said second bridge device 130 deletes this information from its memory and propagates the LEAVE message, received at the step 508, via the other ports of the second bridge device 130 (a step not shown in FIG. 5).

Symmetrically, in a step 509, the first terminal device 111 transmits a LEAVE message in order to unsubscribe the first terminal device 111 from the same multicast transmission.

In a step 510, the first bridge device 120 receives the LEAVE message transmitted at the step 509, identifies via which port of said first bridge device 120 said LEAVE message was received and seeks in memory the presence of information representing said port and said address IP1. When the first bridge device 120 finds this information, said first bridge device 120 deletes this information from its memory. The first bridge device 120 then, in a step 511, propagates said LEAVE message over all the other ports of said first bridge device 120, i.e. all the ports of said bridge device 120 with the exception of the port via which said LEAVE message was received.

In a step 512, the interconnection device 101 receives said LEAVE message propagated by the first bridge device 120 at the step 511 and identifies via which port of said third bridge device 140 said LEAVE message was received. The received LEAVE message is then processed by the consuming module 160 and by the subscription announcement module 170. The consuming module 160 determines whether the received LEAVE message implies an unsubscription from a multicast transmission issuing from the WAN 100. As this is not the case, the consuming module 160 then deletes the received LEAVE message, in a step 513. In a step 514, the subscription announcement module 170 identifies via which port of said third bridge device 140 said LEAVE message was received and seeks in memory the presence of information representing said port in association with the address IP1. When the subscription announcement module 170 finds this information, said subscription announcement module 170 deletes this information from its memory. Next, in a step 515, the subscription announcement module 170 transmits a LEAVE message concerning the multicast transmission identified by the address IP1 via the port via which the previous LEAVE message transmitted by the first terminal device 111 was received, meaning the port 141. This LEAVE message transmitted by the subscription announcement module 170 is then received by the first bridge device 120 via the port 123 in a step 516. The first bridge device 120 then identifies via which port of said first bridge device 120 said LEAVE message was received and seeks in memory information representing said port in said address IP1. When the first bridge device 120 finds this information, said first bridge device 120 deletes this information from its memory and propagates the LEAVE message, received at the step 516, via the other ports of the first bridge device 120 (a step not shown in FIG. 5).

Figure 6:
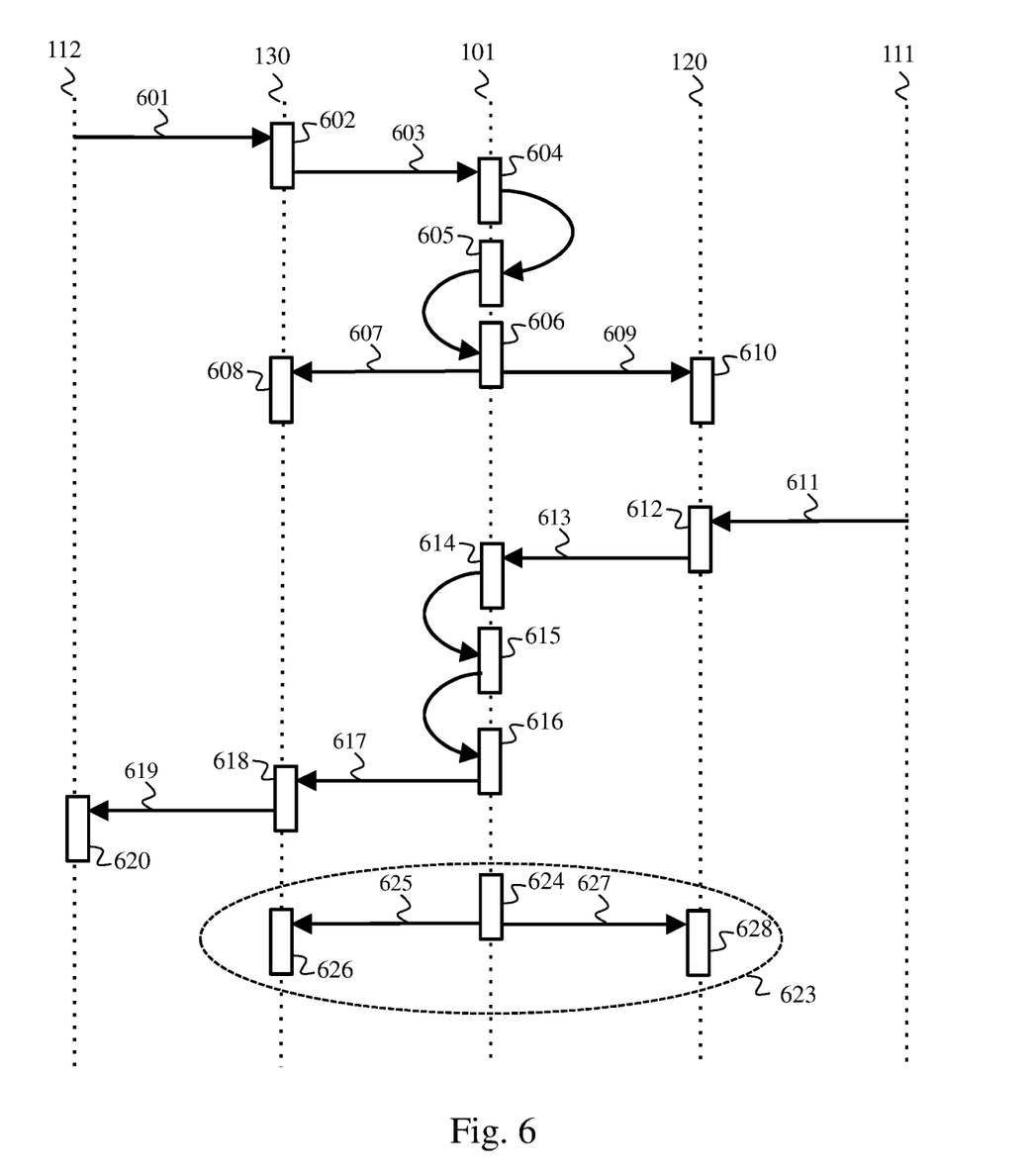
FIG. 6 schematically illustrates message exchanges in the context of subscription to data transmissions via the communication network, according to a second embodiment of the invention.

FIG. 6 schematically illustrates exchanges of message in the context of a subscription to multicast transmissions via the communication network, according to a second embodiment of the invention In a step 601, the second terminal device 112 transmits a JOIN message in order to subscribe the second terminal device 112 to a multicast transmission identified by the address IP2.

In a step 602, the second bridge device 130 receives the JOIN message transmitted at the step 601, identifies via which port of said second bridge device 130 said JOIN message was received and stores in memory information representing said port and said address IP2. The second bridge device 130 then, in a step 603, propagates said JOIN message over all the other ports of said second bridge device 130, i.e. all the ports of said second bridge device 130 with the exception of the port via which said JOIN message was received.

In a step 604, the interconnection device 101 receives said JOIN message propagated by the second bridge device 130 at the step 603 and identifies via which port of said third bridge device 140 said JOIN message was received. The JOIN message received is then processed by the consuming module 160 and by the subscription announcement module 170. The consuming module 160 determines whether the received JOIN message implies a subscription with a multicast transmission issuing from the WAN 100. In the context of multicast transmissions located on the communication network formed by the branches connected to the first 151 and second 152 interfaces of the interconnection device 101, no subscription to a multicast transmission issuing from the WAN 100 is required. The consuming module 160 then deletes the received JOIN message, in a step 605. In a step 606, the subscription announcement module 170 identifies via which port of said third bridge device 140 said JOIN message was received and stores information representing said port in association with the address IP2. Next the subscription announcement module 170 transmits a JOIN message, corresponding to the received JOIN message, over all the ports of the third bridge device 140, meaning including the port via which the JOIN message was received at the step 604, but with the exception of the port to which the WAN 100 is connected. In other words, the JOIN message is transmitted over all the branches of the communication network (the WAN 100 not being a branch of said communication network). Thus, in a step 607, the subscription announcement module 170 transmits a JOIN message concerning the multicast transmission identified by the address IP2 via the port via which the previous JOIN message transmitted by the second terminal device 112 was received, meaning the port 142. This JOIN message transmitted by the subscription announcement module 170 is then received by the second bridge device 130 via the port 132 in a step 608. The second bridge device 130 then identifies via which port of said second bridge device 130 said JOIN message was received and stores in memory information representing said port and said address IP2. The second bridge device 130 then propagates the JOIN message, received at the step 608, via the other ports of the second bridge device 130 (a step not shown in FIG. 6). And, in a step 609, the subscription announcement module 170 transmits a JOIN message concerning the multicast transmission identified by the address IP2 via the port 141. This JOIN message transmitted by the subscription announcement module 170 is then received by the first bridge device 120 via the port 123 in a step 610. The first bridge device 120 then identifies via which port of said first bridge device 120 said JOIN message was received and stores in memory information representing said port and said address IP2. The first bridge device 120 then propagates the JOIN message, received at the step 610, via the other ports of the first bridge device 120 (a step not shown in FIG. 6). The interconnection device 101 then triggers a phase of listening for multicast messages at the address IP2. This phase is for example delimited by a time delay of predefined duration. In a variant embodiment, this phase ends when the interconnection device 101 receives a first multicast message at the address IP2.

When the first terminal device 111 transmits in a step 611 a multicast message to the address IP2, this message is received by the first bridge device 120 in a step 612. The first bridge device 120 retrieves the address IP2 associated with the port 123. The multicast message being received via the port 122, the first bridge device 120 propagates said multicast message via the port 123 in a step 613. The multicast message is then received by the interconnection device 101 in a step 614. The multicast message is then processed by the subscription announcement module 170.

In a step 615, the subscription announcement module 170 creates a virtual client associated with the port of the third bridge device 140 via which said multicast message was received. The virtual client is associated with said port of the third bridge device 140 via which said multicast message was received and with said address IP2.

In a preferred embodiment, the virtual client thus created is not associated with a limited lifetime. Indeed, since no JOIN message is expected from the first terminal device 111, the lifetime of the virtual client is related to the presence of at least one client for the multicast transmission, meaning that the virtual client expires and is deleted when a LEAVE message is received for the last client declared for the multicast transmission or no new JOIN message is received for this last client during a predefined period.

In a variant embodiment, the virtual client thus created may be associated with a predefined lifetime. Before expiry of this lifetime, the interconnection device 101 checks whether the terminal device 111 is continuing the transmission of multicast messages at the address IP2. If such is the case, the interconnection device 101 renews the lifetime of the virtual client; otherwise the virtual client expires and is deleted. This variant embodiment may be more tricky to implement in the case where the interconnection device 101 comprises hardware accelerators and where the subscription announcement module 170 is implemented in software form.

Then, in a step 616, the interconnection device 101 retrieves the address IP2 associated with the port 142. The multicast message being received via the port 141, the third bridge device 140 propagates said multicast message via the port 142 in a step 617. The multicast message is then received by the second bridge device 130 in a step 618. The second bridge device 130 retrieves the address IP2 associated with the port 132 and with the port 133. The multicast message being received via the port 132, the second bridge device 130 propagates said multicast message via the port 133 in a step 619. The multicast message is then received and consumed by the second terminal device 112 in a step 620.

Implementing the subscription announcement module 170, the behaviour of which was described above, thus enables the multicast transmissions in the communication network to succeed even when the device having the role of server in the multicast transmissions does not transmit a JOIN message (which is for example the case with the implementation of a VLC server (the original acronym for "VideoLAN client" inherited from VLS, the acronym for the "VideoLAN server" project).

In a particular embodiment, as long as the interconnection device 101 is in a phase of listening for multicast messages at the address IP2, the subscription announcement module 170 is preferentially adapted for periodically transmitting JOIN messages via all the ports of the third bridge device 140, but with the exception of the port to which the WAN 100 is connected. This enables the first 120 and second 130 bridge devices to keep active the resources reserved for the multicast transmission at the address IP2. Next, when the phase of listening to multicast messages at the address IP2 ends, the subscription announcement module 170 periodically transmits such JOIN messages solely for the ports via which JOIN messages concerning the address IP2 have been received, as at the step 604, as well as for the ports for which virtual clients are being created, as at the step 615. The data traffic in the communication network is thus reduced.

In FIG. 6, this periodic sending phase is symbolised by the group of steps 623. In a step 624, the subscription announcement module 170 detects that a time delay of predefined period has elapsed since the sending of the previous JOIN message or messages by said subscription announcement module 170. The subscription announcement module retrieves the information representing each port of the third bridge device 140 via which a JOIN message was previously received and stored (during the step 606 for example). In the context of FIG. 6, the subscription announcement module 170 retrieves an identifier of the port 142, as stored during the step 606. Next, the subscription announcement module 170 generates and transmits a JOIN message, corresponding to the address IP2, via each port thus identified. Thus, in a step 625, the subscription announcement module 170 transmits this JOIN message via the port 142. This JOIN message is received by the second bridge device 130 in a step 626. The second bridge device 130 increases the lifetime of the multicast transmission associated with the address IP2 with regard to the port via which the JOIN message is received, i.e. the port 132, and propagates the JOIN message via the other ports, i.e. all the ports of said second bridge device 130 with the exception of the port via which said JOIN message was received (a step not shown in FIG. 6). In addition the subscription announcement module 170 retrieves the information representing each port of the third bridge device 140 for which a virtual client was created in association with the address IP2 (during the step 615 for example). In the context of FIG. 6, the subscription announcement module 170 retrieves an identifier of the port 141, as stored during the step 615. Thus, in a step 627, the subscription announcement module 170 transmits the JOIN message via the port 141. This JOIN message is received by the first bridge device 120 in a step 628. The first bridge device 120 increases the lifetime of the multicast transmission associated with the address IP1 with regard to the port by which the JOIN message is received, i.e. the port 123, and propagates the JOIN message via the other ports, i.e. all the ports of said first bridge device 120 with the exception of the port via which said JOIN message was received (a step not shown in FIG. 6). Next, the subscription announcement module 170 reinitialises the time delay, for subsequent reactivation of the periodic sending phase 623.

Figure 7:
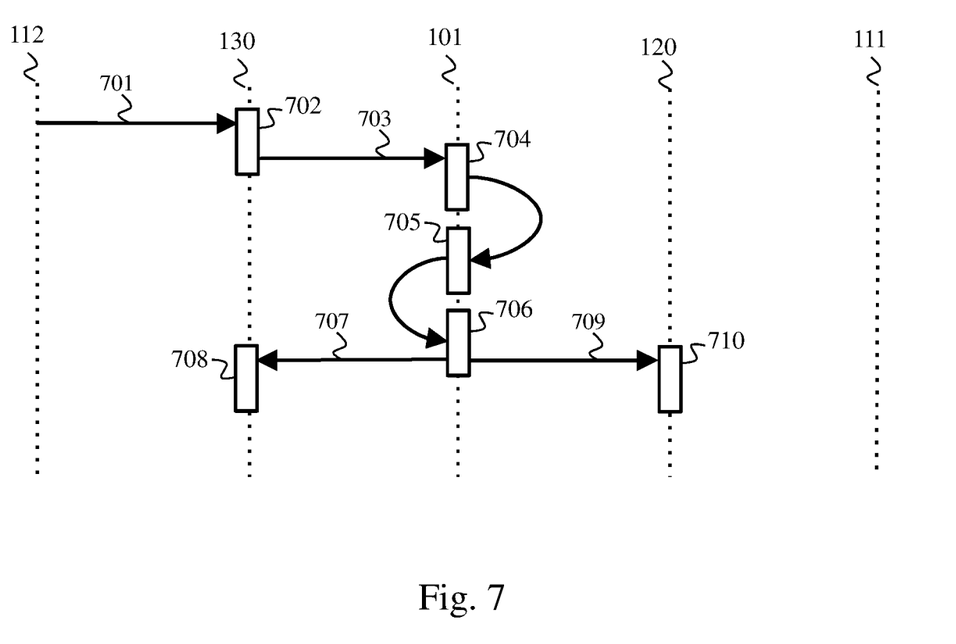
FIG. 7 schematically illustrates message exchanges in the context of unsubscription from data transmissions via the communication network, according to the second embodiment of the invention.

FIG. 7 schematically illustrates exchanges of messages in the context of unsubscription from multicast transmissions via the communication network, according to the second embodiment of the invention.

In a step 701, the second terminal device 112 transmits a LEAVE message in order to unsubscribe the second terminal device 112 from the multicast transmission identified by the address IP2.

In a step 702, the second bridge device 130 receives the LEAVE message transmitted at the step 701, identifies via which port of said second bridge device 130 said leave message was received and seeks in memory the presence of information representing said port and said address IP2. When the second bridge device 130 finds this information, said second bridge device 130 deletes this information from its memory and, in a step 703, propagates said LEAVE message over all the other ports of said second bridge device 130, i.e. all the ports of said second bridge device 130 with the exception of the port via which said LEAVE message was received.

In a step 704, the interconnection device 101 receives said LEAVE message propagated by the second bridge device 130 at step 703 and identifies via which port of said third bridge device 130 said LEAVE message was received. The received LEAVE message is then processed by the consuming module 160 and by the subscription announcement module 170. The consuming module 160 determines whether the received LEAVE message implies an unsubscription from a multicast transmission issuing from the WAN 100. In the context of multicast transmissions located on the communication network formed by the branches connected to the first 151 and second 152 interfaces of the interconnection device 101, no unsubscription from a multicast transmission issuing from the WAN 100 is required. The consuming module 160 then deletes the received LEAVE message, in a step 705. In a step 706, the subscription announcement module 170 identifies via which port of said third bridge device 140 said LEAVE message was received and seeks in memory the presence of information representing said port in association with the address IP2. When the subscription announcement module 170 finds this information, said subscription announcement module 170 deletes this information from its memory. Next, in a step 707, the subscription announcement module 170 transmits a LEAVE message concerning the multicast transmission identified by the address IP2 via the port via which the previous LEAVE message transmitted by the second terminal device 112 was received, meaning the port 142. This LEAVE message transmitted by the subscription announcement module 170 is then received by the second bridge device 130 via the port 132 in a step 708. The second bridge device 130 then identifies via which port of said second bridge device 130 said LEAVE message was received and seeks in memory the presence of information representing said port and said address IP2. When the second bridge device 130 finds this information, said second bridge device 130 deletes this information from its memory and propagates the LEAVE message, received at the step 708, via the other ports of the second bridge device 130 (a step not shown in FIG. 7).

In the step 706, the subscription announcement module 170 also seeks whether at least one virtual client has been created, as at the step 615, in association with the address IP2. When such a virtual client is detected, the subscription announcement module 170 identifies which port of said third bridge device 140 is associated with the virtual client detected. The subscription announcement module 170 then deletes the virtual client from its memory. Next, in a step 709, the subscription announcement module 170 transmits a LEAVE message concerning the multicast transmission identified by the address IP2 via the port associated with the detected virtual client, meaning the port 141. This LEAVE message transmitted by the subscription analysis module 170 is then received by the first bridge device 120 via the port 123 in a step 710. The first bridge device 120 then identifies via which port of said first bridge device 120 said LEAVE message was received and seeks in memory the presence of information representing said port and said address IP2. When the first bridge device 120 finds this information, said first bridge device 120 deletes this information from its memory and propagates the LEAVE message, received at the step 710, via the other ports of the first bridge device 120 (a step not shown in FIG. 7).

For reasons of simplicity of description, the above description of FIGS. 4 to 7 was detailed in the case where only the terminal devices 111 and 112 are endpoints, on the communication network, of the multicast transmissions to which the subscriptions and unsubscriptions relate. Naturally, more terminal devices may be endpoints, on the communication network, of the multicast transmissions to which the subscriptions and unsubscriptions relate. The interconnection device 101 may then receive, coming from separate terminal devices, respective JOIN (or LEAVE) messages with a view to subscribing (or respectively unsubscribing) said terminal devices to or from the multicast transmissions. The device then keeps trace, in association with the port via which a JOIN message is received and the concerned multicast IP address, of the IP address of the device that generated the JOIN message. The subscription announcement module 170 then makes a periodic or pseudo-periodic sending of a JOIN message until no client of the multicast transmission remains on the branch of the communication network via which the JOIN message is to be transmitted. According to the same principle, in the context of the second embodiment described in relation to FIGS. 6 and 7, a virtual client is deleted by the subscription announcement module 170 when a LEAVE message for the last client still declared on the concerned multicast transmission is received by the interconnection device 101, or a time delay of predefined duration has elapsed without a new JOIN request being received. The principle is that the virtual client is deleted when the interconnection device 101 considers that the last client of the multicast transmission concerned is disconnected.

When a periodic sending of JOIN messages on a branch of the communication network relates to a plurality of terminal devices, the subscription announcement module 170 can send a JOIN message for each of these terminal devices. The subscription announcement module 170 then uses as source IP addresses the IP addresses of the terminal devices subscribing to said multicast transmission and present on said branch of the communication network. In a variant embodiment, when a periodic sending of JOIN messages on a branch of the communication network relates to a plurality of terminal devices, the subscription announcement module 170 may send, at each iteration, a single JOIN message for all these terminal devices. The subscription announcement module 170 then uses the IP address of the interconnection device 101 as the source IP address.

The invention claimed is:

1. A method for managing requests for subscription to multicast transmissions in a communication network, the method comprising:
   establishing the communication network with at least two branches in a local area network that are interconnected by an interconnection device comprising an internal bridge device, at least one of the branches comprising at least one bridge device and each branch being connected to said interconnection device via a port of said internal bridge device,
   using a module of the interconnection device to prevent propagation of subscription requests between the two branches in the local area network,
   upon reception via one of the branches of a first request for subscription to a multicast transmission, using a subscription announcement module in the interconnection device to
   identify a port of said internal bridge device via which said first request is received and store in memory information representing said port in association with an IP address of said multicast transmission; and
   transmit a second request for subscription to said multicast transmission identified by said IP address via said port via which the first request for subscription to the multicast transmission was received.

2. The method according to claim 1, wherein said subscription announcement module further performs:
   upon reception via a branch of a first request for unsubscription from a multicast transmission, using a subscription announcement module in the interconnection device to identify a port of said internal bridge device via which said first request for unsubscription is received and deleting from memory information representing said port in association with an IP address of said multicast transmission; and
   transmitting a second request for unsubscription from said multicast transmission identified by said IP address via said port via which the first request for unsubscription from said multicast transmission was received.

3. The method according to claim 1, wherein said subscription announcement module further performs:
   upon reception via a branch of said first subscription request, transmitting said second subscription request via each of port of said internal bridge device; and
   upon reception of a multicast message in the context of said multicast transmission, creation of a virtual client in association with the port of said internal bridge device via which said multicast message was received.

4. The method according to claim 3, wherein said subscription announcement module transmits periodically or pseudo-periodically the second subscription request only via said port of said internal bridge device via which said first request was received and via said port of said internal bridge device for which the virtual client was created.

5. The method according to claim 4, wherein said subscription announcement module deletes said virtual client when the interconnection device considers that the last client of said multicast transmission is disconnected.

6. The method according to claim 1, wherein, when each server of the multicast transmission is supposed to send a request for subscription to said multicast transmission, said subscription announcement module transmits said second subscription request only via said port of said internal bridge device via which said first request was received.

7. The method according to claim 6, wherein said subscription announcement module transmits periodically or pseudo-periodically the second subscription request solely via said port of said internal bridge device via which said first request was received.

8. The method according to claim 1, wherein each branch is identified by the port of said internal bridge device via which said branch is connected.

9. The method according to claim 1, wherein the interconnection device is a residential gateway.

10. A non-transitory computer readable storage medium that stores a computer program comprising instructions for implementing, by an interconnection device, the method according to claim 1, when said program is executed by a processor of said interconnection device.

11. An interconnection device configured for managing requests for subscription to multicast transmissions in a communication network, at least two branches thereof being interconnected via the interconnection device, the interconnection device comprising
   an internal bridge device, each branch being connected to said interconnection device via a port of said internal bridge device;

a module configured to consume a first request for subscription to a multicast transmission and prevent the propagation of the first request from one branch to another branch of the communication network when at least one of the one branch and the other branch includes at least one bridge device and the one branch and the other branch are in a local area network, a subscription announcement module configured to identify a port of said internal bridge device via which said first request is received and store in memory information representing said port in association with an IP address of said multicast transmission; and transmit a second request for subscription to said multicast transmission identified by said IP address via said port via which the first request for subscription to the multicast transmission was received.

12. The interconnection device according to claim 11, wherein the interconnection device is a residential gateway.

* * * * *